No. 870,251. PATENTED NOV. 5, 1907.
F. RASMUSSEN.
TRAP FOR RABBITS AND OTHER ANIMALS.
APPLICATION FILED OCT. 5, 1906.

WITNESSES:
E. H. Stewart
Jno. E. Parker

Frode Rasmussen,
INVENTOR.
By C. A. Snow & Co
ATTORNEYS.

UNITED STATES PATENT OFFICE.

FRODE RASMUSSEN, OF INGLEWOOD, VICTORIA, AUSTRALIA.

TRAP FOR RABBITS AND OTHER ANIMALS.

No. 870,251.       Specification of Letters Patent.      Patented Nov. 5, 1907.

Application filed October 5, 1906. Serial No. 337,663.

*To all whom it may concern:*

Be it known that I, FRODE RASMUSSEN, a subject of the King of Great Britain and Ireland, residing at Brook street, Inglewood, in the county of Gladstone, State of Victoria, and Commonwealth of Australia, have invented new and useful Improvements in Traps for Rabbits or other Animals, of which the following is a specification.

My invention relates to those traps having two jaws which when a table is trodden on or otherwise displaced rise up and close upon and grip anything between them at the moment. In the past a variety of devices have been used for this purpose, but some of them have been defective because they have not been quick enough in operation. Many of the jaws have been closed by devices actuating one end only, and by springs which could not be easily adjusted when their power decreased, but with my invention two springs, one at each end may be employed to close the jaws or only one spring. The action of the jaws is therefore rapid. It is also rendered more positive since I can adjust the springs. In addition to which, traps built according to my invention are not only light and portable, but they may be also rendered humane; for in the past the approaching edges of the jaws have been toothed and the said edges were so thin and sharp that they cut into both the flesh and the bone of the captive. The animal thereby suffered acute pain and frequently escaped through the severance of a limb. Not only so, but when sheep, dogs, or other valuable creatures became gripped they were seriously injured. With my invention, however, when the jaws close, though the animal is arrested until released, neither the flesh nor bone will be injured. Also with my trap the danger of a trapper losing his fingers or damaging the same is practically reduced to a minimum. The chain by which the trap is secured to a stake in the ground has also in its length a duplex ended spring.

Figure 1:
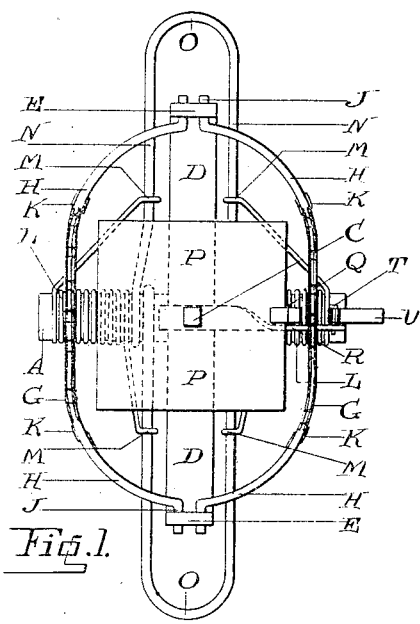
Figure 2:
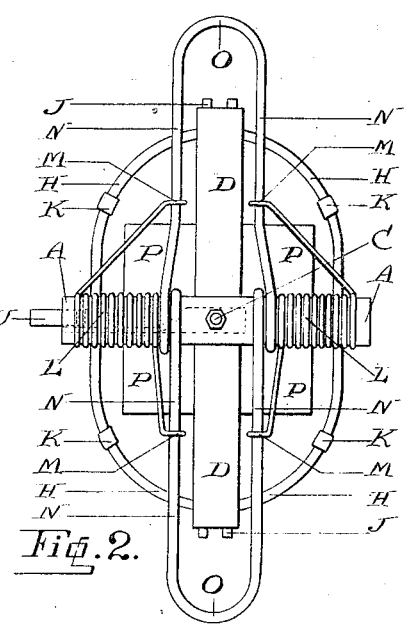
Figure 3:
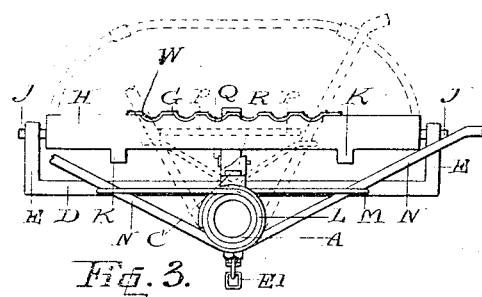
Figure 4:
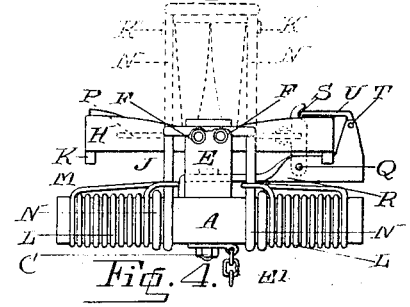
Figure 5:
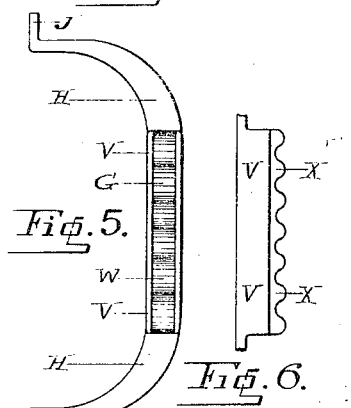
Figure 6:
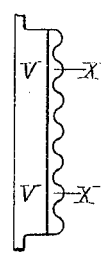
Figure 7:
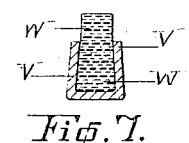
Figure 8:
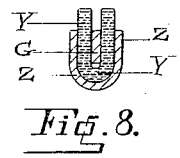
Figure 9:
Figure 10:
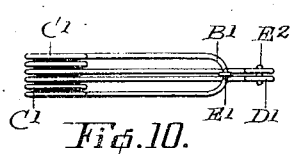
Figure 11:
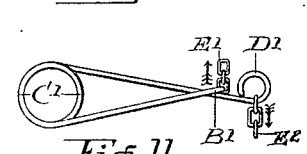

Referring to the drawings which form a part of this specification Figure 1 is a plan view of the invention and showing the positions of the parts just prior to locking the jaws in open or extended position; Fig. 2 is a view of Fig. 1, turned upside down, the jaws still being open. Fig. 3 is a side elevation of the trap. The jaws being shown open in full or black lines and closed in dotted lines. Fig. 4 is an end view, the jaws being illustrated as open in full or black lines, and closed in dotted lines. Fig. 5 is a plan of a box jaw when open. Fig. 6 is a side elevation of portion of the box jaw seen in Fig. 5. Fig. 7 is a section on an enlarged scale of a box jaw. Fig. 8 is a section on an enlarged scale of a composite jaw. Fig. 9 is a section on an enlarged scale of a jaw, to which a strip of rubber or like material is bound. Fig. 10 shows a plan of my duplex spring. Fig. 11 is a side elevation of the same.

Similar letters of reference indicate similar or corresponding parts where they occur in the several views.

On reference to the drawings it will be seen that A is a bottom piece which is preferably of metal and tubular in character. Above it is attached by a bolt C, a cross piece D. Below it may be attached a holding chain hereinafter described. The ends of the said cross piece have up-bent portions E in which (see Fig. 4) are pivot pin holes F. Above the said cross piece are situated a pair of jaws. Each jaw has a gripping portion marked G, a portion marked H and a pinned portion marked J. Each of the pins or pinned portions marked J turns in one of the pivot pin holes marked F. In Figs. 1, 2, 3 and 4 the jaws are shown of a plain character,—*i. e.* of one strip of metal having only a serrated edge. From the rounded portion H of each of the jaws protrudes a limit stop K.

Around each end of the bottom piece A is an unanchored spiral spring L. The end of each spring is outstanding and has a loop M thereon.

Pivoted, one leg on each side of the cross piece D, is a U shaped closing lever N. The inner ends of the legs are bent round the bottom piece A and turn freely thereon. The outer end of the said U shaped lever has a bowed portion as at O.

Above the cross piece D is a table P. This table is of any shape or area and at one side (see Figs. 1 and 4) is pivoted to a pivot pin Q attached to the cross piece extension R. Protruding from the table is a catch having an undercut portion S (see Fig. 4).

Pivoted to the cross piece extension R by a pivot pin T is the outer end of a jaw releasing piece U. The inner end of the jaw releasing piece passes into the undercut portion S of the catch before referred to.

Instead of each of the jaws being of the plain character as before described it may consist of a piece of metal having two walls V, see Figs. 5, 6 and 7. These walls may be any length and height. Between the walls of the said jaw is placed a pad W of india rubber, faced, or partially faced with leather, canvas, or other like material. Or instead of the foregoing any substances which may grip the hair or flesh of the animal without injuring the captive. This pad may be in one piece, and extending the whole length and width of the wall or it may be in several pieces. It protrudes above the wall tops, the amount of the protuberance depending upon circumstances. The outer face instead of being flat may be provided with ridges X. The depth of the ridges, as also their pitch, will depend upon circumstances. The said pad is retained within the box by the outer edges of the walls converging (see Fig. 7).

Instead of a pad W as before described, a composite jaw may be used (see Fig. 8). This consists of the gripping portion G along which are placed strips of flexible material Y. The outer edges of these protrude beyond the outer or gripping edge G. The said strip may be secured to the gripping portion of the jaw by means of a U sectioned clamp Z. The legs of this may be hammered together, thereby locking the flexible material.

In lieu of the flexible gripping contacts before described, a strip of rubber A¹ (see Fig. 9) may be bound by wire or like material to the gripping jaw.
To any convenient portion of the trap is attached one end, the inner end, of a holding chain E¹. The other end, the spring end, is attached to the bowed end B¹ of a duplex ended spring C¹. Each open end of the spring has a ring D¹ formed thereon. To the rings are attached the spring end of another piece of a chain E² the outer end of which is spiked to the ground. With my spring situated in the trap holding chain a lighter spike can be driven in the ground. Also there is less chance of the animal by jerks, freeing itself.

The cycle of operations with my invention is as follows:—In its normal state, when unset, the jaws are closed as shown in dotted lines in Figs. 3 and 4. Whereas when set for action the trap by my holding chain is secured to the ground and the jaws are pressed back and lay down flat as seen in Fig. 4. When the animal treads upon the table P, the latter, being only pivoted at one end, descends. As it falls the catch moves and the undercut portion S is removed from the inner end of the jaw releasing piece U. The latter, by the force of the springs L then flies upwardly and the jaw, previously held by it, is released. Both jaws then rise up and close with a snap. They are lifted by the legs of the U shaped closing levers N which levers are moved upwardly by the loops M upon the outstanding ends of the unanchored or anchored spiral springs L. The said closing levers press underneath the rounded portion H of the jaws and having closed the said jaws come into contact with the limit stops K.
The animal is now secure. It is released by pressing downwardly the bowed portion G of the closing levers and then placing the jaw releasing piece U into the undercut portion S. The trap is then re-set. With my invention, each side of the closing lever riding upon the rounded portion of the jaws, the said jaws close with extraordinary quickness and certainty. In addition to which an effective grip is obtained without injury to the animal.

Having now described my invention, what I claim as new and desire to secure by Letters Patent is:—
1. In a trap, the combination with a bottom piece, a cross piece secured thereon and a tiltable table mounted above the cross piece, of looped levers fulcrumed upon the bottom piece, springs upon the bottom piece and exerting a constant pressure upon the levers, jaws pivotally mounted upon the cross piece and adapted when extended to bear adjacent their pivots upon the levers, a locking device, and a catch movable with the table for holding or releasing the locking device.
2. In a trap the combination with a bottom piece, a cross piece secured thereto, and spring pressed looped levers fulcrumed upon the bottom piece and embracing the cross piece; of jaws pivotally mounted upon the cross piece and having resilient edges, means for locking the jaws in extended position and against the tension of the levers, and movable means for releasing the jaws.
3. In a trap the combination with a bottom piece, a cross piece secured thereto, and spring pressed looped levers fulcrumed upon the bottom piece and embracing the cross piece; of jaws pivotally mounted upon the cross piece and having resilient and serrated edges, means for locking the jaws in extended position and against the tension of the levers, and movable means for releasing the jaws.
4. In a trap the combination with a bottom piece and a cross piece secured thereto; of bowed jaws pivotally mounted upon the cross piece, means for automatically swinging the jaws together, said jaws having serrated working edges, a tiltable table, a locking device for holding the jaws against movement, and means operated by the table for releasing the locking device.
5. A jaw for traps comprising a non-resilient bowed strip having a channeled portion, a folded yielding material clamped within and projecting beyond the channeled portion, and a non-yielding strip interposed between the folds of said material.
6. In a trap the combination with a bottom piece, separate looped levers fulcrumed thereon, and a spring upon said bottom piece exerting a constant pressure upon the looped levers; of a cross piece connected to the bottom piece, jaws pivotally mounted thereon and adapted to be overlapped and actuated by the levers, stops upon the jaws for limiting the movements of the levers, means for locking the jaws in extended position and against the tension of the levers, and movable means for releasing the jaws.

In testimony whereof I affix my signature in the presence of two subscribing witnesses.

FRODE RASMUSSEN.

Witnesses:
EDWIN PHILLIPS,
CECIL McCLESTRIER.